(12) United States Patent
Kanazawa

(10) Patent No.: US 10,130,934 B2
(45) Date of Patent: Nov. 20, 2018

(54) EXHAUST GAS PURIFYING CATALYST AND METHOD FOR PRODUCING THE SAME

(71) Applicant: TOYOTA JIDOSHA KABUSHIKI KAISHA, Toyota-shi, Aichi (JP)

(72) Inventor: Takaaki Kanazawa, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/786,700

(22) Filed: Oct. 18, 2017

(65) Prior Publication Data

US 2018/0036715 A1   Feb. 8, 2018

Related U.S. Application Data

(62) Division of application No. 15/145,947, filed on May 4, 2016.

(30) Foreign Application Priority Data

May 13, 2015 (JP) ................................ 2015-098296
Feb. 12, 2016 (JP) ................................ 2016-024929

(51) Int. Cl.
*B01J 23/00* (2006.01)
*B01J 23/10* (2006.01)
(Continued)

(52) U.S. Cl.
CPC .............. *B01J 23/10* (2013.01); *B01D 53/94* (2013.01); *B01D 53/945* (2013.01); *B01J 21/04* (2013.01);
(Continued)

(58) Field of Classification Search
CPC .................. B01D 53/94; B01D 53/945; B01D 2255/908; B01D 2255/2092;
(Continued)

(56) References Cited

U.S. PATENT DOCUMENTS

2013/0345049 A1   12/2013   Chinzei

FOREIGN PATENT DOCUMENTS

CN   103458997 A   12/2013
JP   8-215569 A   8/1996
(Continued)

OTHER PUBLICATIONS

Takaaki, JPH10202102, Machine Translation, Published in 1998 (Year: 1998).*

(Continued)

*Primary Examiner* — Haytham Soliman
(74) *Attorney, Agent, or Firm* — Sughrue Mion, PLLC

(57) ABSTRACT

Provided is an exhaust gas purifying catalyst with an excellent effect of suppressing deterioration due to aggregation of a noble metal catalyst that would occur during endurance at a high temperature. The exhaust gas purifying catalyst includes a porous support and a noble metal catalyst carried on the porous support. The porous support contains particles of an alumina-ceria-zirconia composite oxide, and the porous support has the following physical property values after subjected to baking at 900° C. for 5 hours: a pore diameter of the particles in the range of 2 to 20 nm, a specific surface area of the particles in the range of 75 to 115 m$^2$/g, a crystallite size of a ceria-zirconia composite oxide that is contained in the particles in the range of 4 to 6 nm, and a bulk density of the particles in the range of 0.5 to 0.9 cm$^3$/g.

1 Claim, 8 Drawing Sheets

(51) Int. Cl.
  *B01J 23/42*  (2006.01)
  *B01J 35/10*  (2006.01)
  *B01J 35/00*  (2006.01)
  *B01D 53/94*  (2006.01)
  *B01J 37/02*  (2006.01)
  *B01J 37/03*  (2006.01)
  *B01J 37/08*  (2006.01)
  *B01J 21/04*  (2006.01)
  *B01J 21/06*  (2006.01)
  *B01J 23/63*  (2006.01)
  *B01J 35/02*  (2006.01)
  *B01J 37/00*  (2006.01)
  *B01J 37/04*  (2006.01)

(52) U.S. Cl.
  CPC ............ *B01J 21/066* (2013.01); *B01J 23/42* (2013.01); *B01J 23/63* (2013.01); *B01J 35/0006* (2013.01); *B01J 35/006* (2013.01); *B01J 35/0026* (2013.01); *B01J 35/026* (2013.01); *B01J 35/1014* (2013.01); *B01J 35/1019* (2013.01); *B01J 35/1061* (2013.01); *B01J 37/009* (2013.01); *B01J 37/0238* (2013.01); *B01J 37/031* (2013.01); *B01J 37/04* (2013.01); *B01J 37/088* (2013.01); *B01D 2255/1021* (2013.01); *B01D 2255/1023* (2013.01); *B01D 2255/1025* (2013.01); *B01D 2255/2092* (2013.01); *B01D 2255/407* (2013.01); *B01D 2255/908* (2013.01); *Y02T 10/22* (2013.01)

(58) Field of Classification Search
  CPC .... B01D 2255/1025; B01D 2255/1021; B01D 2255/407; B01D 2255/1023; B01J 21/04; B01J 37/0238; B01J 37/031; B01J 37/088; B01J 21/066; B01J 35/006; B01J 23/63; B01J 35/0026; B01J 35/1061; B01J 35/1014; B01J 35/1019; B01J 23/42; Y02T 10/22
  USPC ........................................................ 502/325
  See application file for complete search history.

(56) References Cited

FOREIGN PATENT DOCUMENTS

| | | | |
|---|---|---|---|
| JP | 10-202102 | A | 8/1998 |
| JP | 10202102 | A * | 8/1998 |
| JP | 3379369 | B2 | 2/2003 |
| JP | 2012-187518 | A | 10/2012 |

OTHER PUBLICATIONS

Restriction Requirement dated Sep. 28, 2016, issued by USPTO in U.S. Appl. No. 15/145,947.
Non-Final Office Action dated Feb. 10, 2017, issued by USPTO in U.S. Appl. No. 15/145,947.
Final Office Action dated Jul. 20, 2017, issued by USPTO in U.S. Appl. No. 15/145,947.

* cited by examiner

EXHAUST GAS PURIFYING CATALYST AND METHOD FOR PRODUCING THE SAME

This is a divisional of U.S. application Ser. No. 15/145,947, filed May 4, 2016, claiming priority based on Japanese patent application JP 2015-098296 filed on May 13, 2015, and JP 2016-024929 filed on Feb. 12, 2016, the content of which is hereby incorporated by reference into this application.

BACKGROUND

Technical Field

The present invention relates to an exhaust gas purifying catalyst and a method for producing the same.

Background Art

In a variety of industries, a variety of attempts has been made worldwide to reduce environmental impacts and burdens. In particular, in the automobile industry, development for promoting the spread of not only fuel-efficient gasoline engine vehicles, but also so-called eco-friendly vehicles, such as hybrid vehicles and electric vehicles, as well as for further improving the performance of such vehicles has been advanced day by day. In addition to the development of such eco-friendly vehicles, research about an exhaust gas purifying catalyst for purifying exhaust gas discharged from an engine has also been actively conducted.

An exhaust gas purifying catalyst contains an oxidation catalyst, a three-way catalyst, a $NO_x$ storage-reduction catalyst, and the like. A noble metal catalyst, such as platinum (Pt), palladium (Pd), or rhodium (Rh), exhibits catalytic activity in such exhaust gas purifying catalyst. The noble metal catalyst is typically used while being carried on a porous support made of a porous oxide, such as alumina ($Al_2O_3$).

A catalytic converter for purifying exhaust gas is typically arranged in an exhaust system for exhaust gas that connects a vehicle engine and a muffler. The engine may sometimes discharge environmentally harmful substances, such as CO, $NO_x$, and unburned HC and VOC. In order to convert such harmful substances into allowable substances, exhaust gas is passed through a catalytic converter in which a catalyst layer, which contains a noble metal catalyst, such as Rh, Pd, or Pt carried on a porous support, is arranged on the cell wall surface of a substrate, so that CO is converted into $CO_2$, and $NO_x$ is converted into $N_2$ and $O_2$, while VOC is burned to generate $CO_2$ and $H_2O$.

As a porous support on which a noble metal catalyst is carried, a ceria-zirconia composite oxide (which is also referred to as a $CeO_2$—$ZrO_2$ solid solution, a CZ material, and the like) can be used. This is also referred to as a promoter, and is an essential component of the aforementioned three-way catalyst for concurrently removing CO, $NO_x$, and HC that are harmful components in the exhaust gas. Examples of the essential component of the promoter include $CeO_2$.

$CeO_2$ has a property that its oxidation number changes to $Ce^{3+}$ or $Ce^{4+}$, for example, depending on the partial pressure of oxygen in the exhaust gas to which $CeO_2$ is exposed, and has a function of absorbing or releasing oxygen as well as a function of storing oxygen (OSC: Oxygen Storage Capacity) to compensate for the excess or deficiency of electric charges. In addition, $CeO_2$ can absorb and mitigate fluctuations of the exhaust gas atmosphere and maintain the air/fuel ratio at a level around the theoretical air/fuel ratio in order to retain a purifying window of the three-way catalyst.

By the way, exhaust gas purifying catalysts have a problem in that they have deteriorated catalyst performance when exposed to a high temperature. Thus, an improvement in the heat resistance is desired.

The conventional exhaust gas purifying catalysts have been developed with a view to, in order to maintain the specific surface area of a porous support, which has a noble metal catalyst carried thereon, after endurance, avoid sintering of the porous support by forming a number of relatively large pores within the powder of the porous support.

However, when a number of relatively large pores are formed within powder of a porous support, the effect of suppressing sintering (aggregation) of a noble metal catalyst would decrease, and further, when the volume of the powder of the porous support is increased, another problem may occur such that the amount of the catalyst that can be applied to a monolith is limited. Meanwhile, when the number of pores is reduced, the specific surface area of the porous support will decrease, and it becomes difficult for the porous support to carry a noble metal catalyst. Thus, it is quite difficult to adjust the number of pores from the perspective of both carrying a noble metal catalyst and suppressing the aggregation of the noble metal catalyst after endurance.

By the way, Patent Document 1 relates to an exhaust gas purifying catalyst that includes a porous support and catalytic noble metal carried on the porous support, and discloses an exhaust gas purifying catalyst in which the porous support contains particles of an aluminum-cerium-zirconium composite oxide produced from an metal alkoxide, and the composition of the particles in terms of the molar ratio is in the range of Ce/Zr=1/3 to 3/1 and Al/(Ce+Zr)=2 to 10.

In the exhaust gas purifying catalyst described in Patent Document 1, as the composition of the particles in terms of the molar ratio is adjusted in the range of Ce/Zr=1/3 to 3/1 and Al/(Ce+Zr)=2 to 10, OSC will hardly decrease even after endurance. Thus, a time for which the catalyst is exposed to a lean atmosphere is reduced, deterioration due to sintering of a noble metal catalyst and the like is suppressed, and the initial high activity can thus be maintained for a long time.

However, there is still room for improvement of the effect of suppressing deterioration due to sintering of a noble metal catalyst, more particularly, the effect of suppressing deterioration due to aggregation of a noble metal catalyst that would occur during endurance at a high temperature.

RELATED ART DOCUMENTS

Patent Documents

Patent Document 1: JP 3379369 B

SUMMARY

The present invention has been made in view of the foregoing, and it is an object of the present invention to provide an exhaust gas purifying catalyst that has an excellent effect of suppressing deterioration due to aggregation of a noble metal catalyst that would occur during endurance at a high temperature.

In order to achieve the aforementioned object, an exhaust gas purifying catalyst in accordance with the present invention includes a porous support and a noble metal catalyst carried on the porous support. The porous support contains particles of an alumina-ceria-zirconia composite oxide, and has the following physical property values after subjected to baking at 900° C. for 5 hours: a pore diameter of the particles in the range of 2 to 20 nm, a specific surface area of the particles in the range of 75 to 115 m$^2$/g, a crystallite size of a ceria-zirconia composite oxide that is contained in the particles in the range of 4 to 6 nm, and a bulk density of the particles in the range of 0.5 to 0.9 cm$^3$/g.

The exhaust gas purifying catalyst of the present invention is produced by hydrolyzing an aluminum isopropoxide. In addition to the pore diameter of the composite oxide particles set in the range of 2 to 20 nm, the specific surface area of the composite oxide particles is set in the range of 75 to 115 m$^2$/g, the crystallite size of a ceria-zirconia composite oxide that is contained in the composite oxide particles is set in the range of 4 to 6 nm, and the bulk density of the composite oxide particles is set in the range of 0.5 to 0.9 cm$^3$/g. Accordingly, it becomes possible to effectively suppress the aggregation of the noble metal catalyst during endurance at a high temperature.

Specifically, as the pore diameter of the composite oxide particles is set in the range of 2 to 20 nm, the noble metal catalyst is carried only within the pores. Thus, the aggregation of the noble metal catalyst during endurance at a high temperature is suppressed, and a decrease in the activity is suppressed.

In addition, as the bulk density of the composite oxide particles is set in the range of 0.5 to 0.9 cm$^3$/g, the bulk density can be reduced to about a half that of the conventional common particles. Thus, it is possible to coat a monolith by an area about double that of the conventional products.

In addition, as the crystallite size of the ceria-zirconia composite oxide (CZ material) that is contained in the composite oxide particles is in the range of 4 to 6 nm, and with the combined effect of suppressing the aggregation of the noble metal catalyst described above, a high OSC level with high durability can be obtained.

Herein, as the noble metal catalyst carried on the porous support, platinum (Pt), palladium (Pd), or rhodium (Rh) can be used, either alone or in combination.

A method for producing an exhaust gas purifying catalyst of the present invention includes producing an alumina-ceria-zirconia composite oxide by preparing an aqueous solution by dissolving a cerium salt compound and a zirconium salt compound in an aqueous solvent, adding an aluminum isopropoxide into the aqueous solution to produce a precursor solution, removing moisture from the precursor solution, and drying and baking a residue; and producing an exhaust gas purifying catalyst from the alumina-ceria-zirconia composite oxide.

As the aluminum isopropoxide added to the aqueous solution containing a cerium salt and a zirconium salt is hydrolyzed, an alumina-ceria-zirconia composite oxide with a small pore diameter can be produced.

As can be understood from the foregoing description, according to the exhaust gas purifying catalyst of the present invention, a porous support that forms the exhaust gas purifying catalyst contains particles of an alumina-ceria-zirconia composite oxide, and the porous support has, as a physical property value after subjected to baking at 900° C. for 5 hours, at least a pore diameter of the particles in the range of 2 to 20 nm, whereby an exhaust gas purifying catalyst that has an excellent effect of suppressing the aggregation of a noble metal catalyst during endurance at a high temperature can be provided. In addition, according to the method for producing an exhaust gas purifying catalyst of the present invention, an alumina-ceria-zirconia composite oxide with a fine pore diameter can be obtained from an aluminum isopropoxide, and thus, an exhaust gas purifying catalyst that has an excellent effect of suppressing the aggregation of a noble metal catalyst during endurance at a high temperature can be produced.

BRIEF DESCRIPTION OF THE DRAWINGS

FIG. 4A is a graph showing the measurement results at the initial stage (before endurance) and FIG. 4B shows the measurement results after endurance.

DETAILED DESCRIPTION OF THE EMBODIMENT(S)

Figure 1:
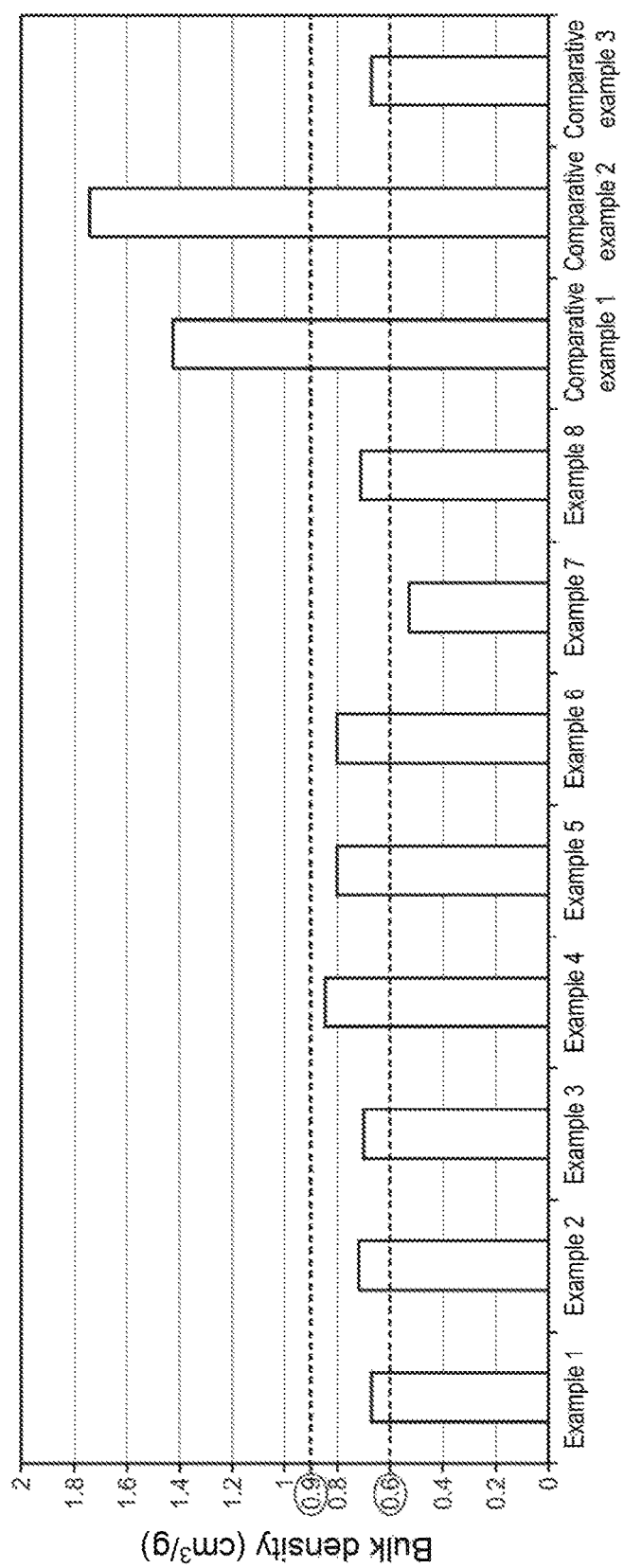
FIG. 1 is a graph showing the measurement results of the bulk density of a composite oxide of each of examples and comparative examples.

Hereinafter, embodiments of the exhaust gas purifying catalyst of the present invention will be described with reference to the drawings. The exhaust gas purifying catalyst of the present invention generally includes a porous support and a noble metal catalyst carried on the porous support.

Herein, the porous support is formed of particles of an alumina-ceria-zirconia composite oxide that has been produced from an aluminum isopropoxide. Based on the results of the experiments described in detail below, the physical property values of the porous support after subjected to baking at 900° C. for 5 hours are defined as follows: a pore diameter of the composite oxide particles in the range of 2 to 20 nm, a specific surface area of the composite oxide particles in the range of 75 to 115 m$^2$/g, a crystallite size of the ceria-zirconia composite oxide that is contained in the composite oxide particles in the range of 4 to 6 nm, and a bulk density of the composite oxide particles in the range of 0.5 to 0.9 cm$^3$/g.

In the process of producing the alumina-ceria-zirconia composite oxide, not ethylene glycol but distilled water was used as a solvent for dissolving $Ce(NO_3)_3 6H_2O$ and $ZrO(NO_3)_2 2H_2O$, whereby it was found to be possible to increase the specific surface area of the alumina-ceria-zirconia composite oxide. In addition, the baking conditions were changed from the low-temperature, short-time baking in the conventional production methods to high-temperature, long-time baking (at about 900° C. or higher and for about 5 hours or longer), whereby it was found to be possible to increase the proportion of mesopores with a diameter in the range of about 2 to 50 nm that are formed in the alumina-ceria-zirconia composite oxide support. Consequently, it was found to be possible to suppress the aggregation of the noble metal catalyst during endurance at a high temperature.
(Various Experiments and Results)

The inventors produced a composite oxide specimen of each of Examples 1 to 8 and Comparative Examples 1 to 3 shown below, and then produced an exhaust gas purifying catalyst by making each composite oxide carry a noble metal catalyst.

EXAMPLE 1

47.1 g $Ce(NO_3)_3 \cdot 6H_2O$ and 52.1 g $ZrO(NO_3)_2 \cdot 2H_2O$ were dissolved in 400 cc ($cm^3$) distilled water, and the mixture was agitated at 85° C. Then, 80.1 g $Al(OC_3H_7)_3$ was slowly added to the mixture while the dissolution was being checked. After the dissolution, moisture was completely removed at 90° C. with a rotary evaporator, and baking was performed at 900° C. for 5 hours to produce a composite oxide of $Al_2O_3:CeO_2:ZrO_2$ with a ratio of 32:30:38.

EXAMPLE 2

A composite oxide was produced under the same conditions as those in Example 1 except that the amount of distilled water in Example 1 was changed to 800 cc.

EXAMPLE 3

A composite oxide was produced under the same conditions as those in Example 1 except that the amount of distilled water in Example 1 was changed to 1200 cc.

EXAMPLE 4

A composite oxide was produced under the same conditions as those in Example 1 except that 8 cc 60% nitric acid was added after $Al(OC_3H_7)_3$ was dissolved in Example 1.

EXAMPLE 5

A composite oxide was produced under the same conditions as those in Example 1 except that 4 cc 60% nitric acid was added after $Al(OC_3H_7)_3$ was dissolved in Example 2.

EXAMPLE 6

A composite oxide was produced under the same conditions as those in Example 1 except that 8 cc 60% nitric acid was added after $Al(OC_3H_7)_3$ was dissolved in Example 2.

EXAMPLE 7

25.3 g $Ce(NO_3)_3 \cdot 6H_2O$ and 47.7 g $ZrO(NO_3)_2 \cdot 2H_2O$ were dissolved in 600 cc ($cm_3$) distilled water, and the mixture was agitated at 85° C. Then, 60.2 g $Al(OC_3H_7)_3$ was slowly added to the mixture while the dissolution was being checked. After the dissolution, moisture was completely removed at 90° C. with a rotary evaporator, and baking was performed at 900° C. for 5 hours to produce a composite oxide of $Al_2O_3:CeO_2:ZrO_2$ with a ratio of 32:21:47.

EXAMPLE 8

70.7 g $Ce(NO_3)_3 \cdot 6H_2O$ and 78.2 g $ZrO(NO_3)_2 \cdot 2H_2O$ were dissolved in 1500 cc ($cm^3$) distilled water, and the mixture was agitated at 85° C. Then, 384.3 g $Al(OC_3H_7)_3$ was slowly added to the mixture while the dissolution was being checked. After the dissolution, moisture was completely removed at 90° C. with a rotary evaporator, and baking was performed at 900° C. for 5 hours to produce a composite oxide of $Al_2O_3:CeO_2:ZrO_2$ with a ratio of 60:18:22.

COMPARATIVE EXAMPLE 1

Instead of $Al(OC_3H_7)_3$, 147 g $Al(NO_3)_3 \cdot 9H_2O$ that contains nitrate was used to produce a 1 L aqueous nitrate solution containing Al, Ce, Zr. Then, an aqueous sodium carbonate solution was added until the pH became 10 and a precipitate was generated. Then, cleaning through filtration was conducted five times, which was then followed by drying at 120° C. and baking at 900° C. for 5 hours so that a composite oxide was produced.

COMPARATIVE EXAMPLE 2

A composite oxide was produced under the same conditions as those in Comparative Example 1 except that, instead of sodium carbonate in Comparative Example 1, an aqueous ammonia solution was used and added until the pH became 10 and a precipitate was generated.

COMPARATIVE EXAMPLE 3

In Example 1, a solution obtained by dissolving 47.1 g $Ce(NO_3)_3 \cdot 6H_2O$ in 100 cc ethylene glycol was produced in advance, and the solution was added after $Al(OC_3H_7)_3$ was added. This is the same method as that described in an embodiment of Patent Document 1 (JP 3379369 B) above.
<Method for Evaluating the Catalyst Performance>

An exhaust gas purifying catalyst was produced by making each of the composite oxides of Examples 1 to 8 and Comparative Examples 1 to 3 carry 1 mass % Pt, and then, an endurance test at 1100° C. for 5 hours was executed on each exhaust gas purifying catalyst to evaluate the performance thereof after the endurance test.
<Results of Experiments>

Figure 2:
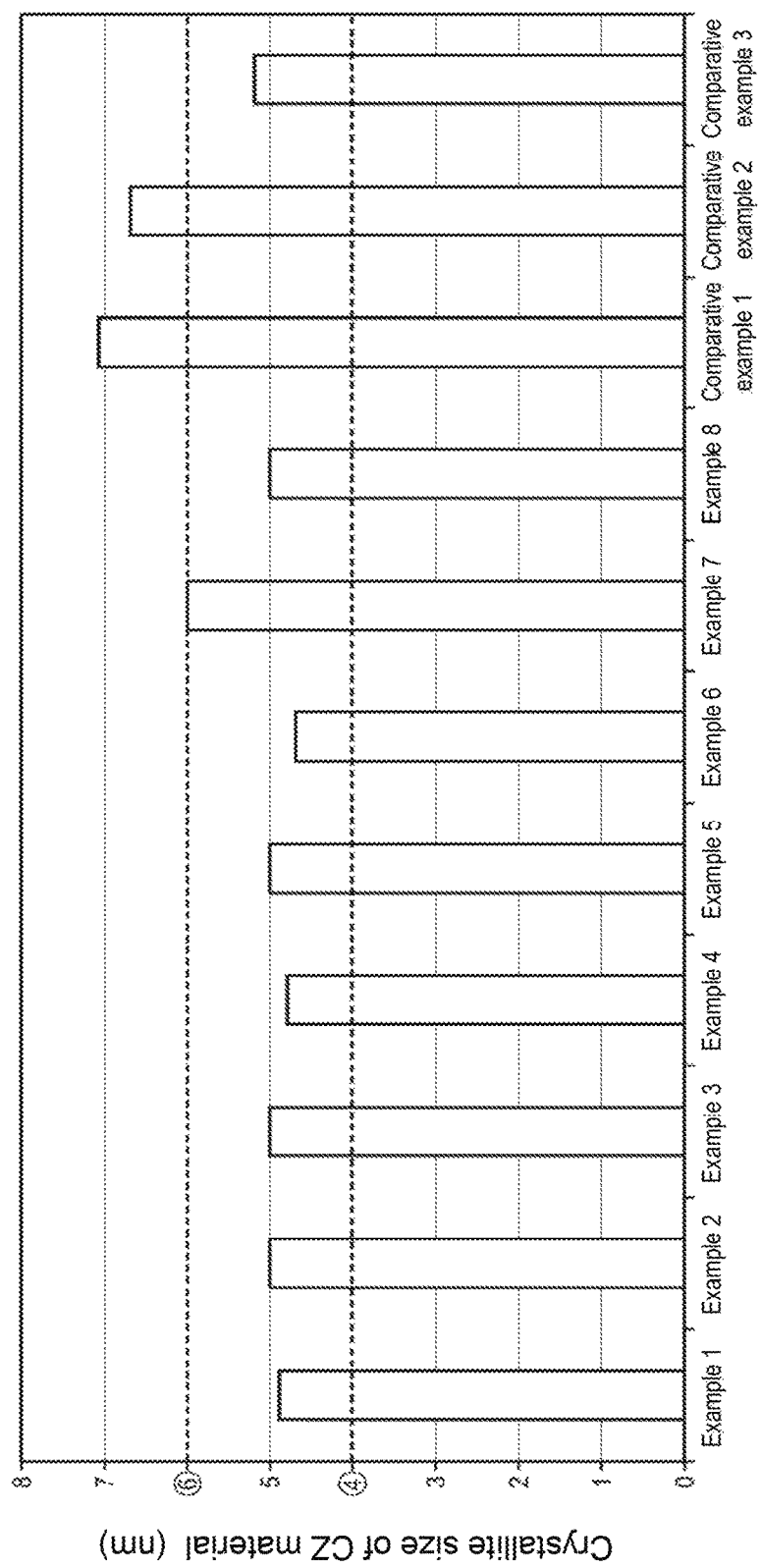
FIG. 2 is a graph showing the measurement results about the crystallite size of a CZ material as a composite oxide of each of examples and comparative examples.
Figure 3:
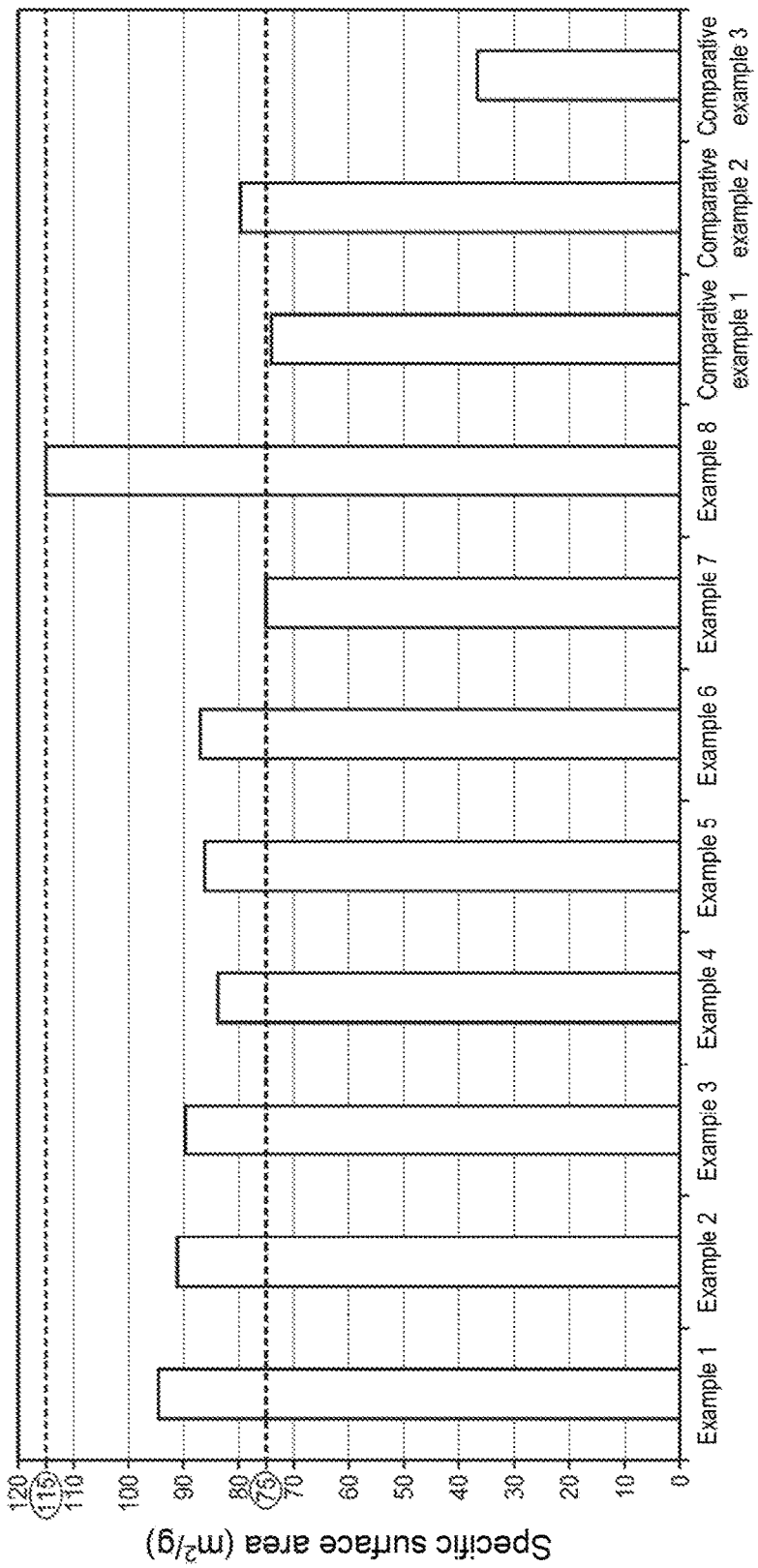
FIG. 3 is a graph showing the measurement results of the specific surface area of a composite oxide of each of examples and comparative examples.
Figure 4A:
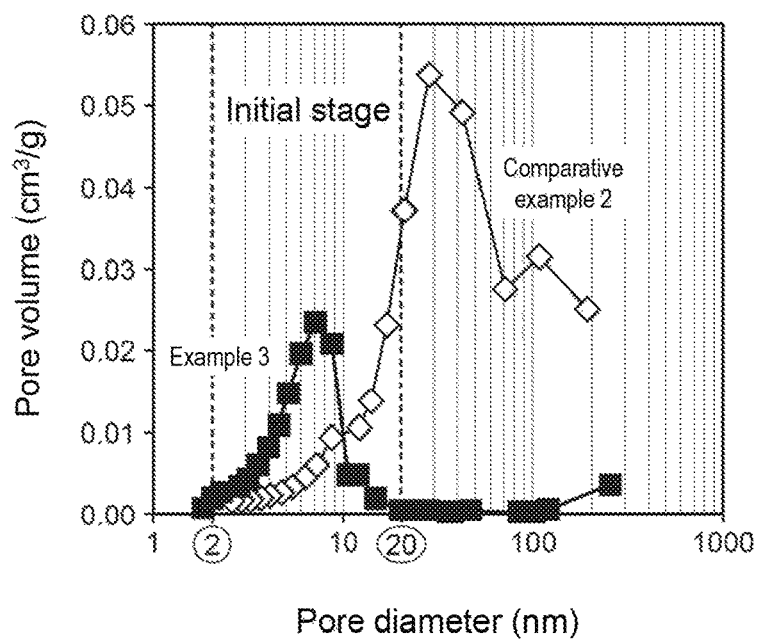
FIGS. 4A and 4B are graphs showing the measurement results of the pore diameter of a composite oxide of each of examples and comparative examples; specifically.
Figure 4B:
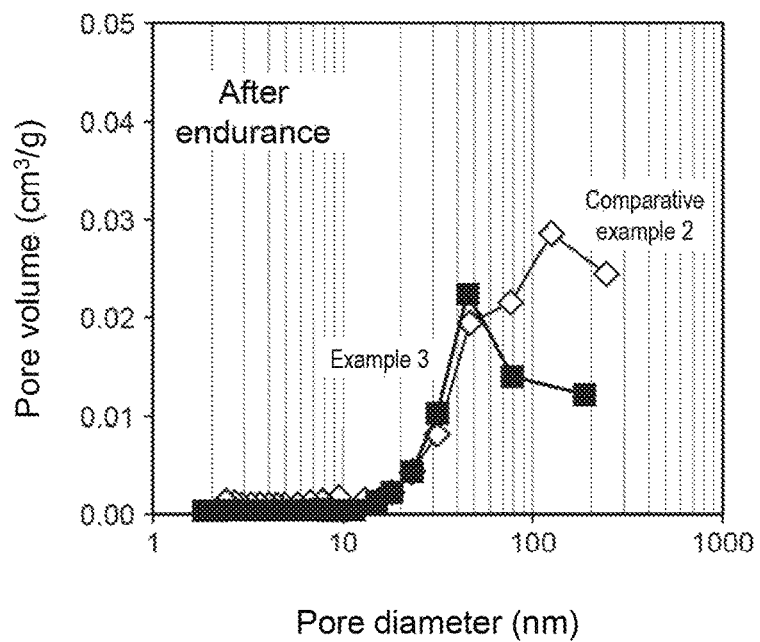
Figure 5:
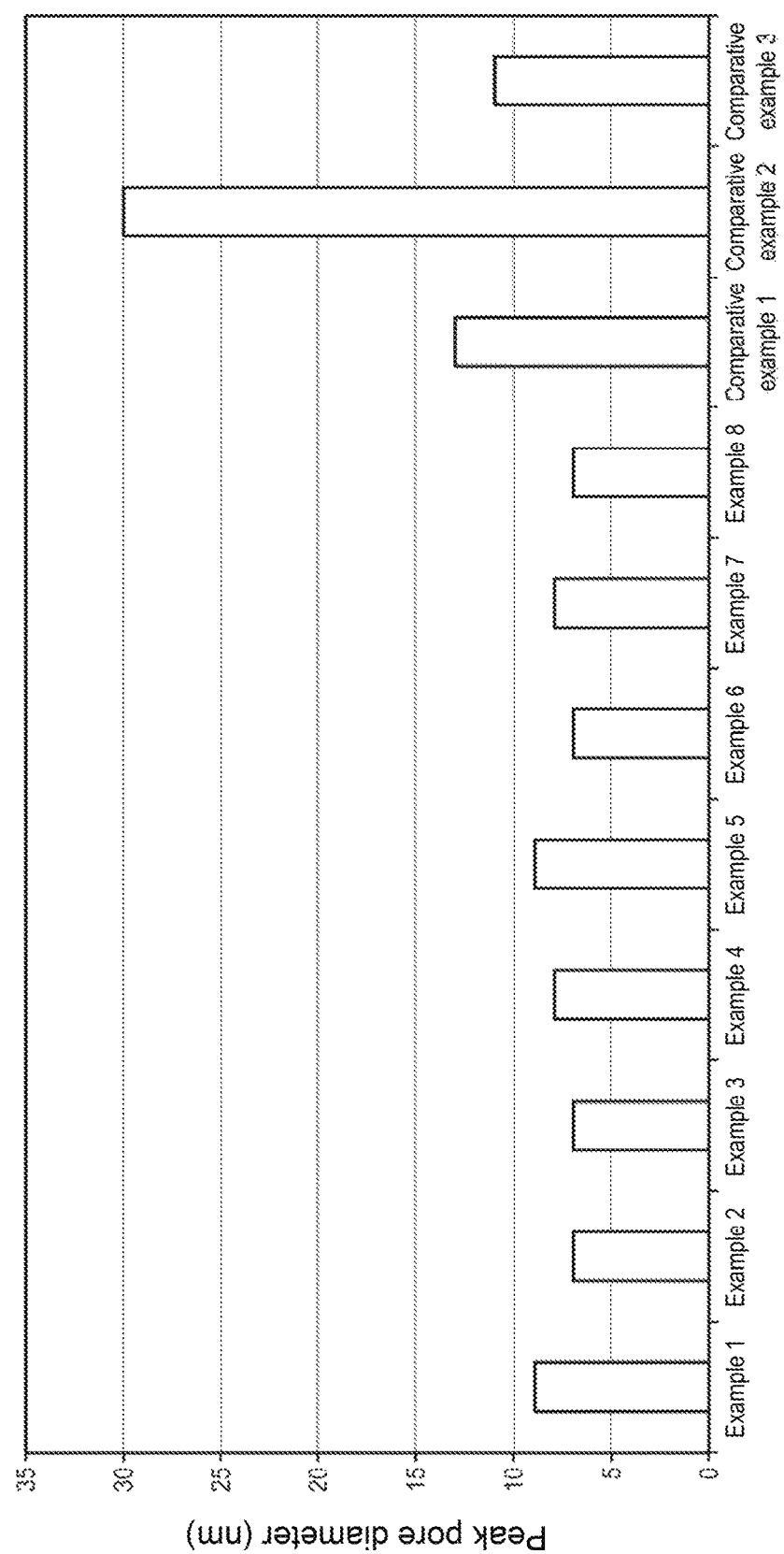
FIG. 5 is a graph showing the measurement results of the peak pore diameter of a composite oxide of each of examples and comparative examples.
Figure 6:
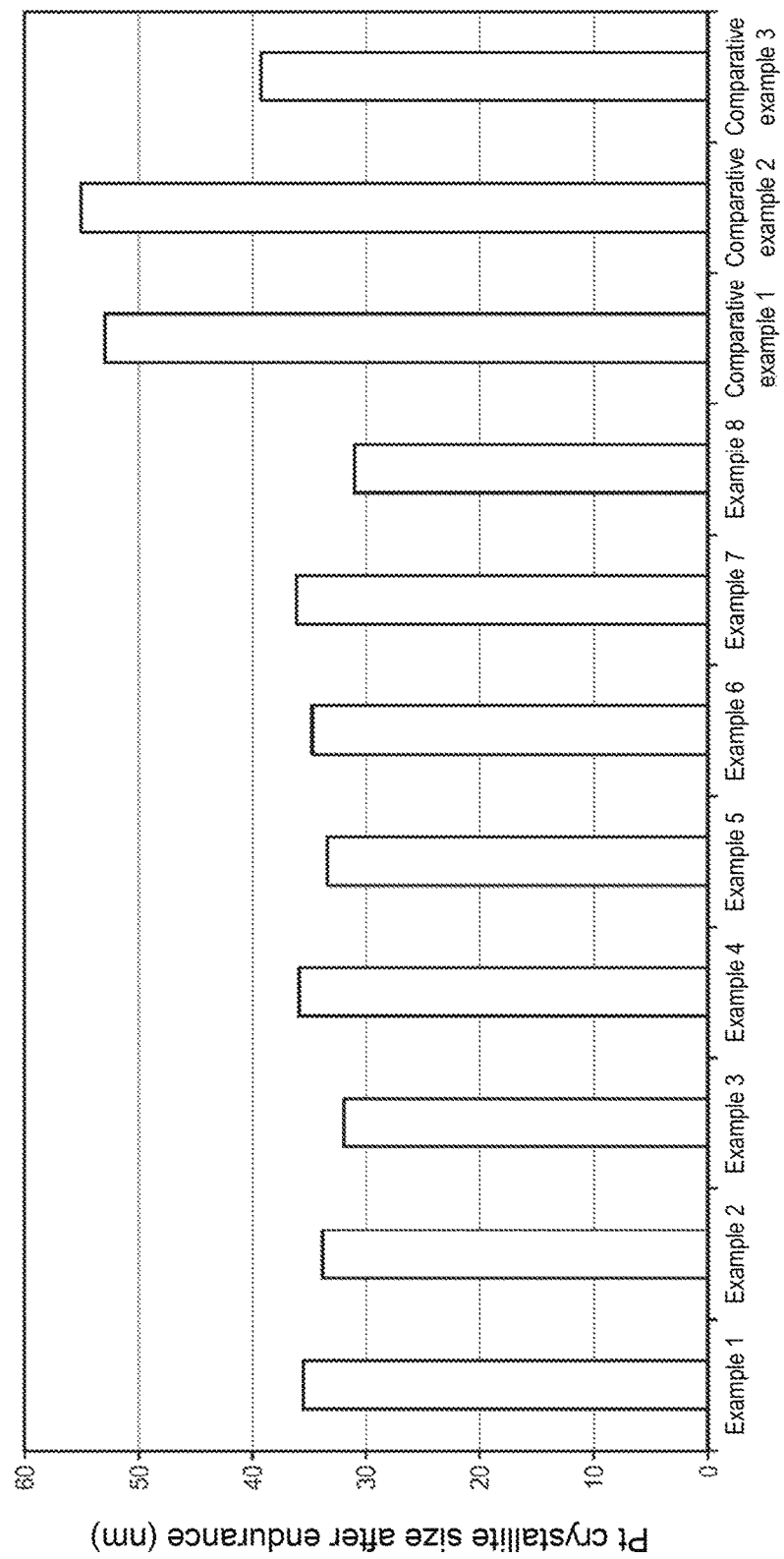
FIG. 6 is a graph showing the measurement results about the Pt crystallite size after endurance of a composite oxide of each of examples and comparative examples.
Figure 7:
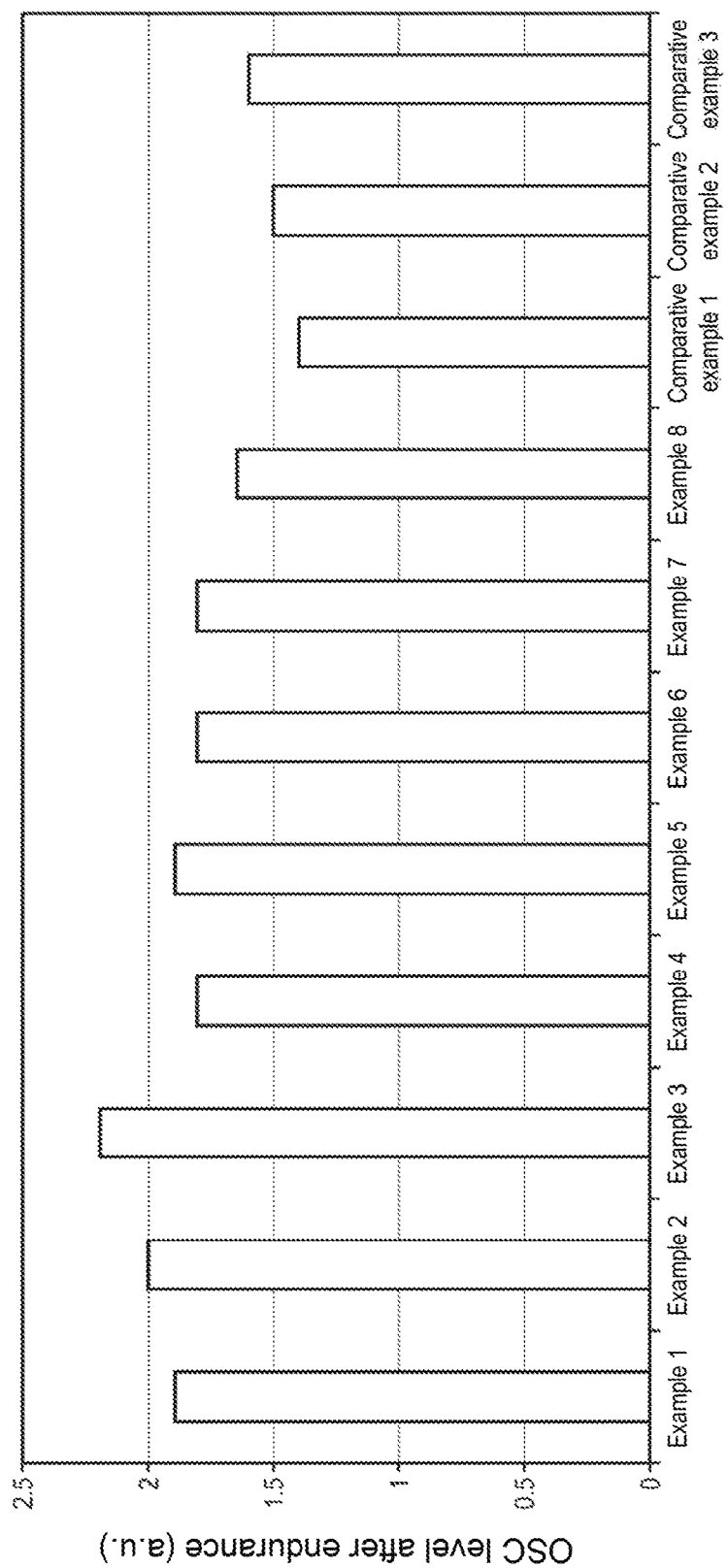
FIG. 7 is a graph showing the measurement results of the OSC level after endurance of each of examples and comparative examples.
Figure 8:
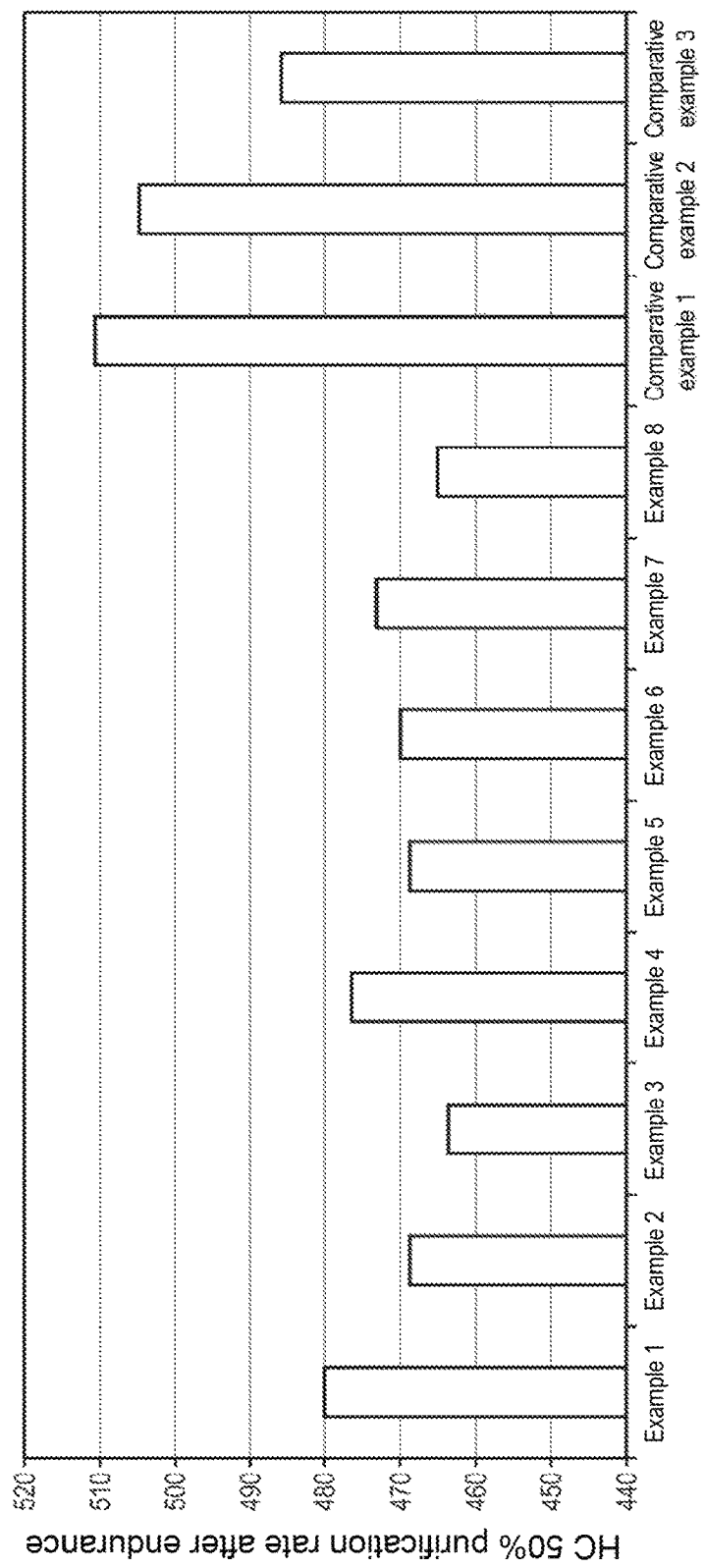
FIG. 8 is a graph showing the measurement results about the HC 50% purification rate after endurance of each of examples and comparative examples.

FIGS. 1 to 5 and Table 1 show the measurement results before the endurance tests, and FIGS. 6 to 8 and Table 2 show the results of the catalyst performance after the endurance tests. Herein, FIG. 1 is a graph showing the measurement results of the bulk density of each specimen. FIG. 2 is a graph showing the measurement results about the crystallite size of a CZ material of each specimen. FIG. 3 is a graph showing the measurement results of the specific surface area of each specimen. FIG. 4 are graphs showing the measurement results of the pore diameter of each specimen; specifically, FIG. 4A is a graph showing the measurement results at the initial stage (before endurance) and FIG. 4B shows the measurement results after endurance. FIG. 5 is a graph showing the measurement results of the peak pore diameter of a composite oxide of each of examples and comparative examples.

TABLE 1

|  | Example 1 | Example 2 | Example 3 | Example 4 | Example 5 | Example 6 | Example 7 | Example 8 |
|---|---|---|---|---|---|---|---|---|
| Peak Pore Diameter (nm) | 9 | 7 | 7 | 8 | 9 | 7 | 8 | 7 |
| Bulk Density (cm$^3$/g) | 0.678 | 0.73 | 0.71 | 0.847 | 0.793 | 0.806 | 0.53 | 0.71 |
| Specific Surface Area (m$^2$/g) | 94.6 | 91.6 | 89.9 | 84.6 | 86.4 | 87.2 | 75 | 115 |
| Crystallite Size of CZ Material (nm) | 4.9 | 5 | 5 | 4.8 | 5 | 4.7 | 6 | 5 |

|  | Comparative Example 1 | Comparative Example 2 | Comparative Example 3 |
|---|---|---|---|
| Peak Pore Diameter (nm) | 13 | 30 | 11 |
| Bulk Density (cm$^3$/g) | 1.43 | 1.74 | 0.685 |
| Specific Surface Area (m$^2$/g) | 74.5 | 79.7 | 36.9 |
| Crystallite Size of CZ Material (nm) | 7.1 | 6.7 | 5.2 |

First, referring to FIG. 1 and Table 1, the bulk density of each specimen was measured in accordance with JIS R1628:1997. FIG. 1 can confirm that the bulk density of each of Comparative Examples 1 to 3 is in the range of 0.7 to 1.7 cm$^3$/g, while the bulk density of each of Examples 1 to 8 is in the range of 0.5 to 0.9 cm$^3$/g, which is about a half that of Comparative Example 1 or 2. This means that the amount of the catalyst that can be applied to a monolith in each of Examples 1 to 8 is about double that of Comparative Example 1 or 2.

Next, referring to FIG. 2 and Table 1, the crystallite size of the CZ material of each specimen was measured using an X-ray diffraction method in accordance with JIS H7805:2005. FIG. 2 can confirm that the crystallite size of the CZ material of each of Comparative Examples 1 to 3 is in the range of 5 to 7 nm, while the crystallite size of the CZ material of each of Examples 1 to 8 is in the range of 4 to 6 nm.

Next, referring to FIG. 3 and Table 1, the specific surface area of each specimen was measured in accordance with JIS R1626:1996. FIG. 3 can confirm that the specific surface area of each of Comparative Examples 1 to 3 is in the range of 35 to 80 m$^2$/g, while the specific surface area of each of Examples 1 to 8 is in the range of 75 to 115 m$^2$/g.

Next, referring to FIG. 4A, Example 3 and Comparative Example 2 that exhibited favorable results of the endurance tests were extracted to measure the initial pore diameters of the specimens before the endurance tests. Distributions of the pore diameters are shown herein. It is seen that the peak of the pore diameter of Example 3 is in the range of 2 to 20 nm. It should be noted that the peak of the pore diameter of Comparative Example 2 is in the range of about 10 to 70 nm.

FIG. 4B can confirm that a distribution of the pore diameter of Example 3 after the endurance test has a peak in the range of about 20 to 70 nm, and that of Comparative Example 2 after the endurance test has a peak in the range of about 70 to 120 nm. Thus, it is found that the pore diameter of each specimen has changed from the result shown in FIG. 4A by several tens of nm.

Next, from FIG. 5 and Table 1, it is found that the peak of the pore diameter (i.e., peak pore diameter) of the CZ material of each of the specimens of Examples 1 to 8, which has been measured with a nitrogen adsorption method, is less than or equal to 10 nm, while that of each of Comparative Examples 1 to 3 tends to be over 10 nm.

Next, evaluation of the catalyst performance after endurance will be discussed with reference to FIGS. 6 to 8 and Table 2. Herein, FIG. 6 is a graph showing the measurement results about the Pt crystallite size after endurance of each specimen. FIG. 7 is a graph showing the measurement results of the OSC level after endurance of each specimen. FIG. 8 is a graph showing the measurement results about the HC 50% purification rate after endurance of each specimen.

TABLE 2

|  | Example 1 | Example 2 | Example 3 | Example 4 | Example 5 | Example 6 | Example 7 | Example 8 |
|---|---|---|---|---|---|---|---|---|
| Pt Grain Size after Endurance (nm) | 35.6 | 33.9 | 32.1 | 36 | 33.2 | 34.7 | 36 | 31 |
| OSC Level after Endurance (a.u.) | 1.9 | 2 | 2.2 | 1.8 | 1.9 | 1.8 | 1.8 | 1.65 |
| HC 50% Purification Rate after Endurance | 480 | 469 | 464 | 477 | 469 | 470 | 473 | 465 |

|  | Comparative Example 1 | Comparative Example 2 | Comparative Example 3 |
|---|---|---|---|
| Pt Grain Size after Endurance (nm) | 53.1 | 55.2 | 39.1 |
| OSC Level after Endurance (a.u.) | 1.4 | 1.5 | 1.6 |

TABLE 2-continued

| | | | |
|---|---|---|---|
| HC 50% Purification Rate after Endurance | 511 | 505 | 486 |

Referring to FIG. 6 and Table 2, the Pt crystallite size of each specimen was measured using an X-ray diffraction method in accordance with JIS H7805:2005. FIG. 6 can confirm that the Pt grain size after endurance of each of Comparative Examples 1 to 3 is as large as about 40 to 55 nm, while the Pt grain size after endurance of each of Examples 1 to 8 is about 31 to 36 nm, which are much smaller than those of the comparative examples.

This is because the aggregation of Pt during endurance at a high temperature is suppressed in Examples 1 to 8.

Next, from FIG. 7 and Table 2, it is found that the OSC level (oxygen storage capacity) after endurance of each of Comparative Examples 1 to 3 is 1.4 to 1.6 (a.u.), while the OSC level after endurance of each of Examples 1 to 8 is 1.65 to 2.2 (a.u.), which are higher than those of the comparative examples by 40% or more.

Further, from FIG. 8 and Table 2, it is found that the HC 50% purification rate after endurance of each of Comparative Examples 1 to 3 is about 490 to 510, while the HC 50% purification rate after endurance of each of Examples 1 to 8 is about 460 to 480, which shows that the HC purification performance of each example is high.

Based on the results in FIGS. 1 to 5, the following conditions were defined for particles of an alumina-ceria-zirconia composite oxide that forms the exhaust gas purifying catalyst of the present invention: a pore diameter of the composite oxide particles in the range of 2 to 20 nm, a specific surface area of the composite oxide particles in the range of 75 to 115 m$^2$/g, a crystallite size of the ceria-zirconia composite oxide that is contained in the composite oxide particles in the range of 4 to 6 nm, and a bulk density of the composite oxide particles in the range of 0.5 to 0.9 cm$^3$/g.

In addition, the results in FIGS. 6 to 8 demonstrate that according to the exhaust gas purifying catalyst containing the composite oxide of the present invention, it is possible to effectively suppress the aggregation of a noble metal catalyst after the endurance tests, increase the OSC level, and increase the HC purification rate.

Although the embodiments of the present invention have been described in detail with reference to the drawings, specific configurations are not limited thereto. The present invention includes any changes in the design and the like that are within the spirit and scope of the present invention.

What is claimed is:

1. A method for producing an exhaust gas purifying catalyst, comprising:
    producing a porous support containing particles of an alumina-ceria-zirconia composite oxide by preparing an aqueous solution by dissolving a cerium salt compound and a zirconium salt compound in an aqueous solvent, adding an aluminum isopropoxide into the aqueous solution to produce a precursor solution, removing moisture from the precursor solution, and drying and baking a residue; and
    producing an exhaust gas purifying catalyst by making the porous support carry a noble metal catalyst, wherein
    the porous support has the following physical property values after subjected to baking at 900° C. for 5 hours:
    a peak pore diameter of the particles in a range of 7 to 9 nm,
    a specific surface area of the particles in a range of 75 to 115 m$^2$/g,
    a crystallite size of a ceria-zirconia composite oxide that is contained in the particles in a range of 4 to 6 nm, and
    a bulk density of the particles in a range of 0.5 to 0.9 cm$^3$/g.

* * * * *